United States Patent [19]

Schachinger et al.

[11] 4,104,518
[45] Aug. 1, 1978

[54] SHUT-DOWN APPARATUS FOR CONVEYOR BELTS IN UNDERGROUND MINES

[75] Inventors: Martin Schachinger; Heiko Krüger, both of Erlangen, Fed. Rep. of Germany

[73] Assignee: Siemens Aktiengesellschaft, Munich, Fed. Rep. of Germany

[21] Appl. No.: 747,864

[22] Filed: Dec. 6, 1976

[30] Foreign Application Priority Data

Dec. 23, 1975 [DE] Fed. Rep. of Germany ....... 2558323

[51] Int. Cl.² ........................................... G01D 21/04
[52] U.S. Cl. ..................................... 250/221; 250/226
[58] Field of Search ................................ 250/221, 226

[56] References Cited

U.S. PATENT DOCUMENTS

| | | | |
|---|---|---|---|
| 2,495,249 | 1/1950 | Gilbert ............................ | 250/221 X |
| 3,335,285 | 8/1967 | Gally et al. .......................... | 250/221 |

*Primary Examiner*—David C. Nelms
*Assistant Examiner*—Darwin R. Hostetter

*Attorney, Agent, or Firm*—Kenyon & Kenyon, Reilly, Carr & Chapin

[57] ABSTRACT

An improved manually-operated, emergency shutdown apparatus for a motor-driven conveyor belt in an underground mine. The apparatus comprises a laser beam transmitter disposed at one of the ends of the conveyor belt and laterally spaced from one of the sides of the belt for generating a laser beam in a direction parallel to the longitudinal axis of the conveyor belt within reaching distance of a person riding on the belt. A laser light beam receiver is disposed at the opposite end of the conveyor belt and is coupled to the drive mechanism for the conveyor belt for receiving the laser beam generated by the transmitter and controlling movement of the conveyor belt in response to manual interruption of the laser beam by a person riding on the belt. The beam transmitter and receiver are arranged with respect to the conveyor belt so that the direction of transmission of the laser beam from the transmitter to the receiver is opposite the direction of movement of the conveyor belt.

4 Claims, 2 Drawing Figures

SHUT-DOWN APPARATUS FOR CONVEYOR BELTS IN UNDERGROUND MINES

BACKGROUND OF THE INVENTION

1. Field of the Invention

The present invention relates to an improved manually-operated, emergency shutdown apparatus for conveyor belts in underground mines.

2. Description of the Prior Art

Emergency shutdown apparatus for conveyor belts in underground mines which are operated by a pull rope disposed parallel to the conveyor belt in the mine so that a person riding on the belt can reach the pull rope with his hand from any point of the conveyor are known in the art. The pull rope in such apparatus is coupled to switches disposed at predetermined distances along the conveyor belt path. When the rope is pulled, the nearest switch is actuated and shuts down the drive mechanism of the conveyor belt. In order to resume operation of the conveyor belt after shutdown, the switch mechanically latched by the pull rope must be unlatched.

The foregoing types of apparatus have the disadvantage that maintenance of the pull rope switches involves considerable cost. In addition, because of the high velocities of conveyor belts which are generally used at present, there is considerable danger to the person riding on the conveyor belt in attempting to operate or operating the pull rope in order to shut down the conveyor belt.

SUMMARY OF THE INVENTION

It is therefore an object of the present invention to overcome the aforementioned disadvantages of heretofore known apparatus and to provide an improved manually-operated, emergency shutdown apparatus for conveyor belts in underground mines which is substantially maintenance-free and safe to operate.

These and other objects of the invention are achieved in a manually-operated, emergency shutdown apparatus for a conveyor belt driven by drive means in an underground mine. The improvement of the invention comprises laser light beam transmission means disposed at one of the ends of the conveyor belt and laterally spaced from one of the sides of the belt for generating a laser beam in a direction parallel to the longitudinal axis of the conveyor belt within reaching distance of a person riding on the belt. Laser light beam receiving means is disposed at the other end of the conveyor belt and is coupled to the drive means for receiving the laser beam generated by the transmission means and controlling movement of the belt in response to manual interruption of the laser beam by a person riding on the belt. The laser light beam transmission means and receiving means are arranged so that the direction of transmission of the laser beam from the transmission means to the receiving means is opposite the direction of movement of the conveyor belt.

The foregoing arrangement enables emergency shutdown of the conveyor belt to be effected merely by manual interruption of the laser beam, and danger to the person riding on the conveyor belt and initiating the emergency shutdown is eliminated.

In a preferred embodiment of the invention, the laser light beam receiving means includes a circuit for counting the number of interruptions of the laser beam. In this arrangement, unintended resumption of the operation of the conveyor belt by another interruption of the laser beam is prevented. In addition, this arrangement permits coded messages to be transmitted by means of a predetermined number of interruptions of the laser beam.

These and other novel features and advantages of the invention will be described in greater detail in the following detailed description.

BRIEF DESCRIPTION OF THE DRAWINGS

In the drawings, wherein similar reference numerals denote similar elements throughout the several views thereof.

DETAILED DESCRIPTION

Figure 1:
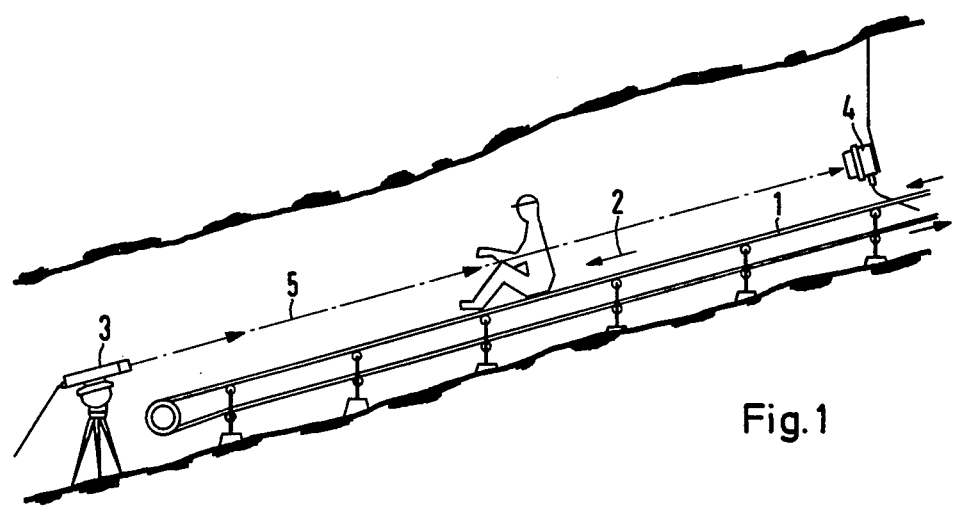
FIG. 1 is a schematic diagram of an improved manually-operated, emergency shutdown apparatus for a conveyor belt in an underground mine constructed according to the present invention.

Referring now to the drawings, and in particular to FIG. 1, there is shown a motor-driven conveyor belt 1 which moves in a direction indicated by the arrow 2. A laser beam transmitter 3 is disposed at one end of conveyor belt 1 and is displaced laterally with respect to one of the sides of the conveyor belt for generating a laser beam 5 in a direction parallel to the longitudinal axis of the conveyor belt and opposite the direction of movement of the belt so that the beam can be reached without effort by a person riding on the conveyor belt. A laser beam receiver 4 is disposed at the other end of conveyor belt 1 for receiving the laser beam generated by the transmitter. The receiver is coupled to the drive mechanism (not shown) for conveyor belt 1 and shuts off the belt drive mechanism when the laser beam is interrupted, for example, manually by the person riding on the conveyor belt.

Figure 2:
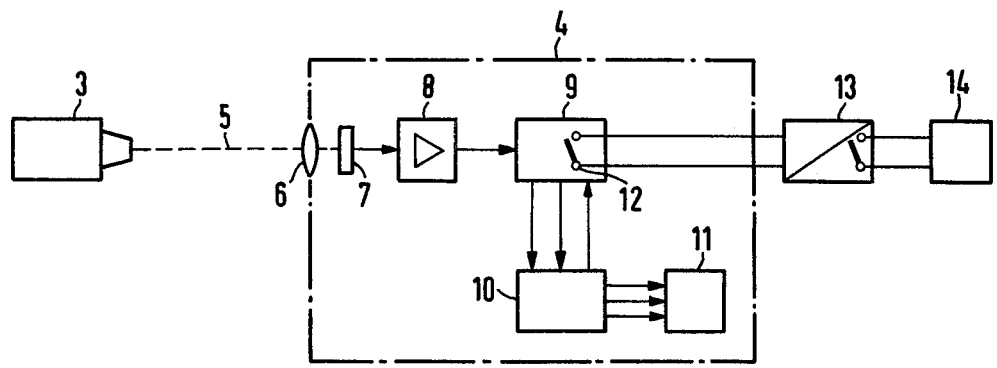
FIG. 2 is a schematic block diagram of a manually-operated, emergency shutdown apparatus constructed according to the present invention.

As shown in FIG. 2, laser beam 5 generated by transmitter 3 strikes a condenser lens 6 disposed in receiver 4 and is detected in the receiver by a photocell 7 disposed behind condenser lens 6 along the direction of travel of the laser beam. The photocell is preferably of the type which is insensitive to extraneous light and is coupled to an amplifier 8, a control circuit 9, a counting and holding circuit 10 for determining the number of interruptions of the laser beam, and a display or indicating device 11 including signal transmitters, for example, light-emitting diodes. Control circuit 9 includes a relay and a relay switch 12 to which a control device 14 for the belt drive mechanism of the conveyor belt is coupled by means of an intrinsically fail-safe coupling member 13, which also includes a relay.

In operation of the apparatus, relay switch 12 opens, and the drive mechanism of the conveyor belt 1 is shut down, when laser beam 5 is interrupted once by a person riding on the conveyor belt. If, however, the laser beam is interrupted, for example, four times within a period of six seconds, the relay in control circuit 9 is energized by counting and holding circuit 10 and relay switch 12 is closed. The display device 11 simultaneously indicates readiness of the conveyor belt for operation, and the conveyor belt drive mechanism is reactivated.

By requiring multiple interruption of the laser beam for resumption of operation of the conveyor belt, accidental interruption of the laser beam, which is continuously present adjacent the conveyor belt, and establishment of readiness for resumption of operation when the conveyor belt is standing still, is prevented. The receiver 4 is also preferably provided with signal transmitters of different colors for decoding signals generated by a predetermined number of interruptions of the laser beam.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. In a manually-operated, emergency shutdown apparatus for a conveyor belt driven by drive means in an underground mine, the improvement comprising, laser light beam transmission means, disposed at one of the ends of said conveyor belt and laterally spaced from one of the sides of said conveyor belt, for generating a laser beam in a direction parallel to the longitudinal axis of said conveyor within reaching distance of a person riding on said belt and laser light beam receiving means, disposed at the other end of said conveyor belt and coupled to said drive means, for receiving said laser beam generated by said transmission means and controlling movement of said conveyor belt in response to manual interruption of said laser beam by a person riding on said belt, said laser light beam transmission means and receiving means being arranged so that the direction of transmission of said laser beam from said transmission means to said receiving means is opposite the direction of movement of said conveyor belt and said laser light beam receiving means including circuit means for counting the number of interruptions of said laser beam.

2. The apparatus recited in claim 1, wherein said laser light beam receiving means includes a condenser lens for receiving said laser beam and a photocell disposed in said receiving means behind said condenser lens along the direction of travel of said laser beam for detecting said interruptions of said laser beam.

3. The apparatus recited in claim 2, wherein said photocell is insensitive to extraneous light.

4. The apparatus recited in claim 2, wherein said laser light beam receiving means includes optical signal transmission means of different colors for decoding signals generated by said receiving means in response to a predetermined number of interruptions of said laser beam.

* * * * *